UNITED STATES PATENT OFFICE.

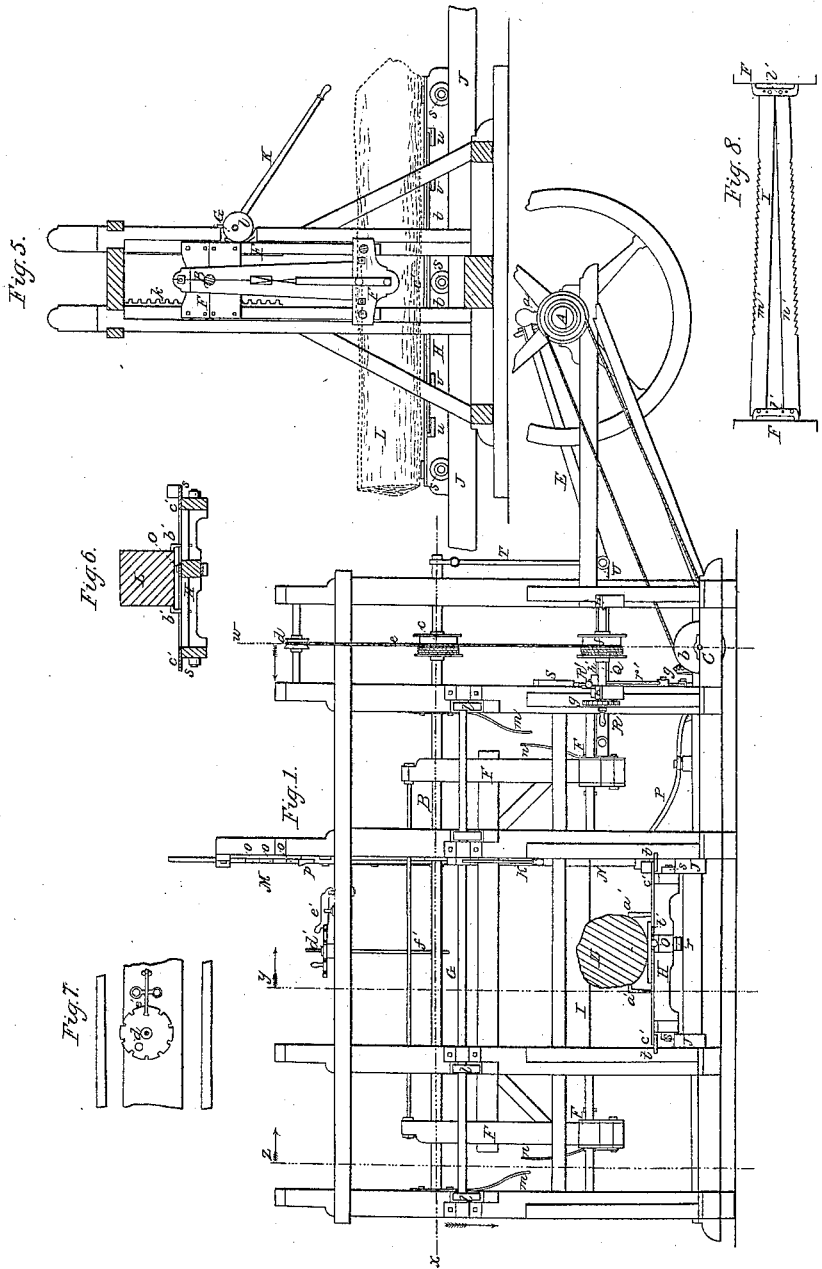
A. Ralston,
Reciprocating Saw Mill.
Nº 9,977.
Patented Aug. 30, 1853.

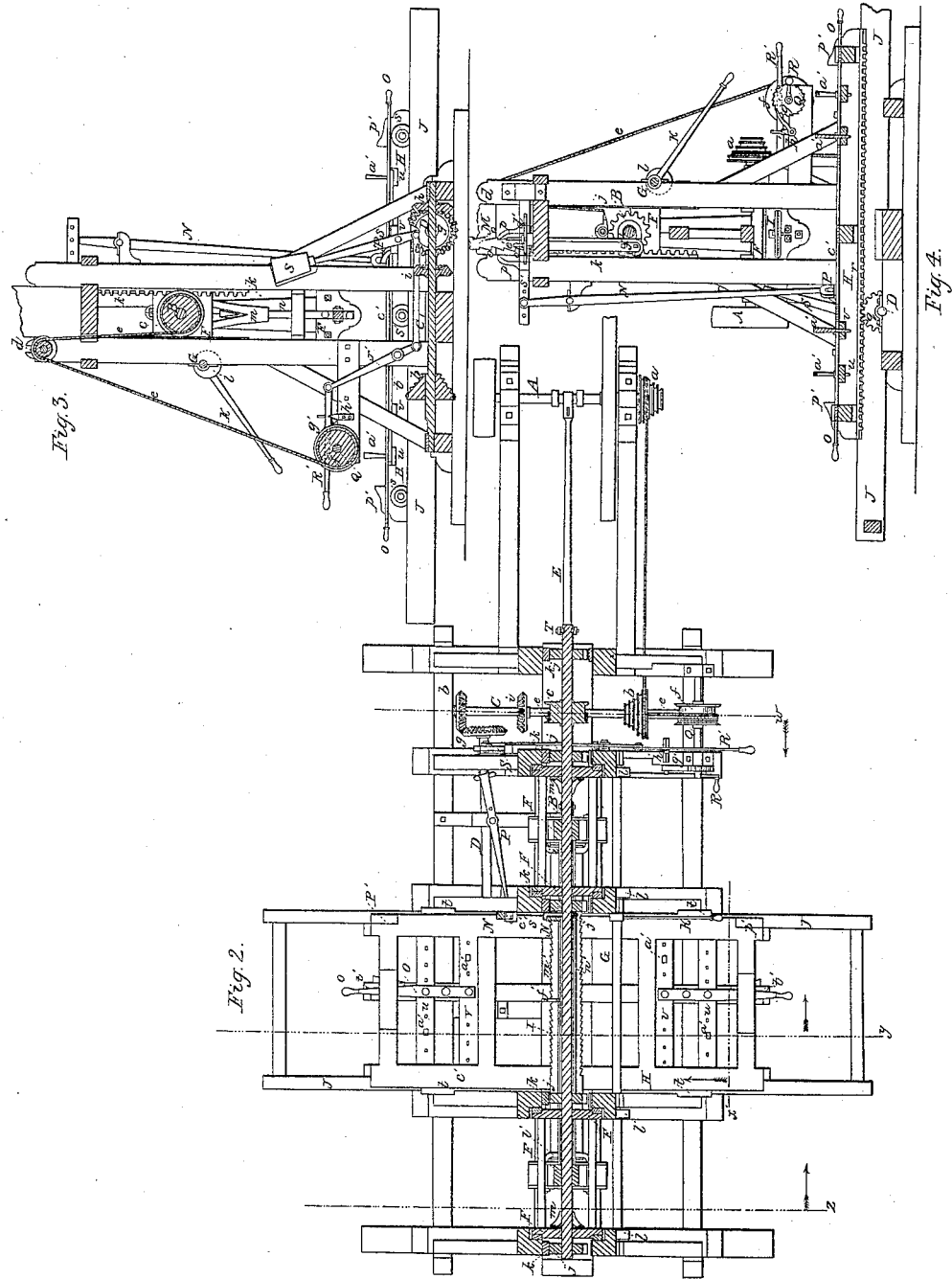

ANDREW RALSTON, OF WEST MIDDLETOWN, PENNSYLVANIA.

SAWMILL.

Specification of Letters Patent No. 9,977, dated August 30, 1853.

*To all whom it may concern:*

Be it known that I, ANDREW RALSTON, of West Middletown, in the county of Washington and State of Pennsylvania, have invented a new and Improved Sawmill; and I do hereby declare that the following is a full and exact description thereof, reference being had to the accompanying drawings, making part of this specification, Figure 1 being a side elevation of the sawmill; Fig. 2, a horizontal section thereof in the line $x$ of Fig. 1; Figs. 3, 4, and 5, transverse vertical sections thereof, respectively in the lines $w, y, z$, Figs. 1 and 2; Fig. 6, a vertical section in the line $x'$, Fig. 2; and Figs. 7 and 8 views of parts detached.

Like letters designate corresponding parts in all the figures.

The nature of my invention consists, first, in sawing logs or other descriptions of timber lengthwise with a saw operating in a horizontal position, for the purpose of enabling the saw to be run at a much higher velocity than it can be with safety when operated in a vertical position; secondly, in such an arrangement and combination of the horizontal saw with the other parts of the saw-mill, that the saw will run through and beyond each end of the log or other description of material operated upon, and while in that position, will be automatically let down a distance equal to the thickness of stuff desired to be cut, and the motion of the carriage reversed to bring the saw again into action; and so on, until the log or other material operated upon, shall be entirely sawed into the dimensions required; thirdly, in forming teeth on both edges of the saw, in combination with the arrangement of parts for reversing the movement of the carriage and feeding it back and forth, and also for shifting the position of the saw at the termination of each run through the log or other material, substantially as hereinafter set forth; fourthly, in making the said double-toothed saw broader at one end than at the other, or uniting two single-toothed saws back to back, and spreading them apart at one end, for the purpose of throwing the double series of teeth into oblique positions to the line of movement of said saw or saws; fifthly, in connecting the operating pitman to the saw-gate through the medium of two vibrating arms T and U, which are jointed, at one end, to each other and to the pitman, and at the other end, respectively to the saw frame and saw-gate; and so arranged that one of the said arms will be in a line—or nearly so—parallel with the direction of the saw, and the other at right angles thereto; for the purpose of enabling the saw-frame to rise and fall without being strained by the varying inclination of the pitman to the direction of the saw, substantially as hereinafter set forth; sixthly, in the combination and arrangement of the transverse sliding bars $u, v$, &c., and their movable fastening irons $a', a'$, &c., with the levers O, O, and the carriage H, for the purpose of rigidly and readily confining a log or other piece of timber to the carriage preparatory to being sawed, substantially as hereinafter set forth; seventhly, in combination with my said horizontally acting saw, in the graduating hook $f'$, and its set-screw $d'$, combined with the shaft B, and the series of cams $l, l$, &c., on the shaft G, in such a manner that the saw-frame is governed in its movements and is held in any desired position for sawing dimension stuff, substantially as hereinafter set forth.

I place the saw I, horizontally in a saw-gate which moves backward and forward in a suitable saw-frame F, arranged as follows:—It is made to slide vertically between several pairs of upright posts which form part of the frame of the mill. A shaft B, extending lengthwise through the upper part of the saw-frame, and from which said saw-frame is suspended, is provided with a series of equal-sized pinions $j, j$, &c., one at each pair of posts, and playing respectively in corresponding racks $k, k$, &c., attached to said posts on one side of the shaft, while on the other side thereof, the pinions are simply in contact with the posts or metallic plates thereon. Hence, by turning the shaft, the saw-frame will be raised or lowered, according to the direction in which it turns. When said shaft is left to turn freely, the weight of the saw-frame is sufficient to carry it down. In order to again raise the frame, the shaft B, is provided with a fast pulley $c$, around which coils, several times, a rope, or band, c, that passes thence up over a pulley d, situated at the proper height, and thence, in several coils, around another pulley f, upon a shaft Q, which is turned by a crank R. When the saw-frame is down, the cord c, is wound upon the pulley f, by turning said crank in the proper direction, which consequently causes the shaft B, to revolve so as to raise its frame again.

A ratchet-wheel and click q', is added to the shaft Q, in order to hold the frame in any position, when desired, but is not ordinarily in use. The saw-frame is let down a proper distance for sawing the next board, at the close of each run of the saw, by means of a ratch M, (Fig. 4,) attached to the saw-frame, and provided with notches, o, o, etc., on either edge, so arranged as to alternate with one another in position—i. e., any notch, on one edge, being half-way between the next notches above and below on the other edge—and that the distance between the notches shall be double the required thickness of the board, together with the necessary saw-kerf. Into these notches, alternately play escapement detents p, p, which are secured to a horizontally sliding bar s', and are arranged so that, on vibrating said bar, as soon as one detent is freed from the ratch, the other detent catches the next higher notch on the other edge of the ratch. By this means the saw-frame is allowed to fall, at each run of the saw, from one notch to the next higher notch on the other edge of the ratch, or a distance equal to the required thickness of the boards and the kerf in sawing them off, till the log is completely sawed. The ratch M, is removable, and replaceable by others having notches at different distances apart to suit the different thickness of boards and planks required. The detents p, p, are operated by means of a vibrating lever N, jointed, at the upper end, to the bar s', and so arranged that blocks or projections, p', p', attached to, and adjustable on the carriage H, will, as soon as the saw has completely run out of the log, strike its lower end and cause it to vibrate the detents as required. The saw I, is provided with teeth on both edges, in order to saw both ways, and thus to require no power or delay for running back the carriage. In order to give the requisite rake to the saw, it is made wider at one end than at the other, as shown in Fig. 2; or two saws (as at m', n', Fig. 8,) may be placed back to back, and spread apart at one end by any adjustable means. The former method is preferable in respect to securing greater stiffness to the saw; but the latter is better in respect to varying the rake at pleasure. Or, the single saw may be arranged so as have its rake automatically shifted, to any extent, from one side to the other at each run of the saw; or, it may have a single toothed edge, and be turned over, at each run thereof, by suitable mechanical means operating simultaneously with the other movements of the saw-frame; but such devices I do not contemplate in practice.

The horizontal arrangement of the saw enables me to give it a much higher speed than if in the vertical position, where the necessary weight of the saw-gate causes such a strain on the machinery as to oppose an early limit to its velocity. Its momentum is also further subdued by springs m m, and n, n, respectively attached to the saw-frame and saw-gate, and playing against each other at the termination of each stroke of the saw, as distinctly shown in Fig. 1.

The saw is driven by means of a pitman E, operated by a crank on the driving shaft A. Said pitman is pivoted to two vibrating arms T, U, at the junction of their vibrating ends, which consequently move together and with the pitman. The connecting arm U, vibrates on the end of the saw-gate, as a fulcrum, in a horizontal position; while the pendulum arm T, vibrates on some part of the saw-frame, as a fulcrum, in a vertical position, or at right angles to the arm U. The effect of these arms is to prevent the strain on the mill, which would otherwise ensue, when the inclination of the pitman E, to the direction of the saw becomes considerable, as is the case when the saw-frame is near the top and bottom of its movement.

The carriage H, moves upon the track or ways, J, at right angles to the motion of the saw—generally upon rollers s, s, &c. rolling on said ways. In order to obviate any rocking or unsteadiness of the carriage by the use of said rollers, I cause plates, or ledges, c', c', projecting from its edges, to slide in contact with ledges t, t, projecting from the mill-frame, or the track, and to bear thereon with only just sufficient force to keep the carriage steady. The log to be sawed, is secured upon the carriage by means of two transverse sliding bars u, v, on each end of the carriage, which are respectively caused to slide in opposite directions by means of levers O, O, pivoted to both bars and to the carriage half-way between them, as shown in Fig. 2. Said bars are perforated at suitable intervals; into which perforations, fits a fastening iron a', in each bar, one on each side of the log near the same; then, by operating the levers O, O, the log will be securely held, and may be confined by keys, or wedges, t', t', driven in by the side of the levers, or by any equivalent means. When the log is first put on the carriage for squaring, it is necessary to use long fastening irons a', a', in order to grasp the log near its center, as seen in Fig. 1; but after being squared, the log is held by short fastening irons b', b', (as in Fig. 6,) which do not project high enough to interfere with the saw when working the last runs through the log. By this arrangement, the log is effectually secured with great facility and despatch.

The carriage is moved upon the track with a continual motion by the following means:—A rack r, (Fig. 4,) is secured lengthwise to the under side of the carriage, into which plays a pinion q, situated on one end of a shaft D, the other end of which is provided with a bevel wheel g, and is permitted to vibrate horizontally enough for said wheel to be geared alternately into other bevel wheels h, i, placed upon a shaft C, at a proper distance apart to allow said wheel g, to remain ungeared from both, between them, if desired. The shaft C, is revolved at the requisite speed to feed the log up to the saw, by means of a band passing over pulleys a, and b, one upon said shaft and the other upon the driving shaft A. Said pulleys are furnished with grooves of different diameters, by shifting said band into different ones of which, the feed of the carriage is varied. On shifting the wheel g, from one of the wheels h, i, to the other, the carriage, of course, will be driven in the opposite direction. This change is required to take place at the end of each run of the saw through the log. To accomplish this, a lever P, is arranged so as to embrace, with one arm, the vibrating end of the shaft D, (as in Fig. 2,) while the other end is connected with the lower end of the lever N, which operates the detents of the ratch M, as before described, and thus acts simultaneously therewith and by the same means. As the wheel g, is by said lever P, moved from one of the wheels h, i, to the other, a loaded lever S, which is pivoted to the millframe, and has its lower end attached to the vibrating end of the shaft D, is so arranged as to have its upper, or loaded, end thrown over its center of support by said movement, and then by its own weight carries said wheel g, into and holds it in gear with its bevel wheel h, or i. Its action, though effectual, is yielding; and consequently no injury can arise, as would be the case with a positive and unyielding action. The reversal of the motion of the carriage is thus rendered automatic. Provision is also made for shifting said gearing by hand by means of a vibrating lever r', (Fig. 3,) and a rod connecting one arm thereof with the shaft D, and a lever R', jointed to the other arm. Said lever R', is provided with three notches on its under side, which fall over a catch h', and respectively hold the wheel g, in gear with either wheel h, or i, or ungeared from both. When the motion of the carriage is to be reversed by the machine itself, said lever is removed from the catch h'.

In sawing dimensions stuff, where the thickness varies much, the ratch M, cannot be used for letting down the saw-frame the proper distance. In that case, I employ a graduating hook f', (Figs. 1, and 7,) passing down through the top of the millframe, and close to the shaft B, or some other part of the saw-frame, which it may grapple. It is provided with a set-screw d', which is graduated, so that, by turning it any certain distance, the hook will be raised or lowered a known distance, and is held in any position by a click e'. When not in use, the hook f', may be turned away from the shaft B; but when it is to be used, it is let down, by its set-screw, a distance, equal to the thickness of the stuff to be sawed, below, and its hooked end turned around to receive, said shaft B; and the saw-frame is then allowed to fall and rest upon it. Since, in this case, the ratch M, can not be employed, and is consequently removed, it is necessary to have some means of sustaining the saw-frame, while adjusting the hook f'. For this purpose I make use of a shaft G, extending near, and parallel with, the saw-frame, and attach to it a series of cams l, l, &c. to be placed respectively near the upright posts in which the saw-frame slides. By depressing a lever K, attached to said shaft, the cams are so arranged as to press against the saw-frame with sufficient force to sustain it; and by again raising said lever, the cams will be separated from the saw-frame, and allow it to descend.

My improved saw-mill is especially suitable for a portable mill. By its peculiar arrangement, compactness and lightness, I am enabled to transport it with great ease, and very soon set it up, and put it in operation. In this respect, I find it superior to any other mill known to me. It is also superior as a stationary saw-mill.

Having thus fully described my improved saw mill, what I claim therein as new and desire to secure by Letters Patent, is—

1. Sawing logs, or other descriptions of timber, into lumber by means of a reciprocating saw operated in a horizontal position substantially as herein set forth.

2. I claim such an arrangement and combination of the horizontal saw with the other parts of the saw-mill, that the saw will run through and beyond each end of the log, or other description of material operated upon, and while in that position, will be automatically let down a distance equal to the thickness of stuff desired to be cut, and the motion of the carriage reversed to bring the saw again into action without stopping the machine; and so on until the log or other material operated upon, shall be entirely sawed into the dimensions required, substantially as herein set forth.

3. I claim connecting the operating pitman E, with the saw-gate through the medium of a secondary pitman U, connected with the saw-frame and saw gate substantially as described; so that the operating force shall be applied in a direction nearly coincident with that of the saw in its successive positions, for the purposes set forth.

The above specification of my improved saw mill, signed this 6th day of June 1853.

ANDREW RALSTON.

Witnesses:
Z. C. ROBBINS,
J. S. BROWN.